US010449866B2

(12) United States Patent
Seong et al.

(10) Patent No.: US 10,449,866 B2
(45) Date of Patent: Oct. 22, 2019

(54) COIL ALIGNMENT METHOD FOR ALIGNING A VEHICLE ASSEMBLY COIL WITH A GROUND ASSEMBLY COIL AND ELECTRIC VEHICLE WIRELESS POWER TRANSFER APPARATUS USING THE SAME

(71) Applicants: Hyundai Motor Company, Seoul (KR); Kia Motors Corporation, Seoul (KR); Konkuk University Industrial Cooperation Corp., Seoul (KR)

(72) Inventors: Jae Yong Seong, Gyeonggi-Do (KR); Won Shil Kang, Seoul (KR); Hyun Chul Ku, Seoul (KR); Jong Gyun Lim, Seoul (KR)

(73) Assignees: Hyundai Motor Company, Seoul (KR); Kia Motors Corporation, Seoul (KR); Konkuk University Industrial Cooperation Corp., Seoul (KR)

( * ) Notice: Subject to any disclaimer, the term of this patent is extended or adjusted under 35 U.S.C. 154(b) by 217 days.

(21) Appl. No.: 15/612,142

(22) Filed: Jun. 2, 2017

(65) Prior Publication Data

US 2017/0361725 A1    Dec. 21, 2017

(30) Foreign Application Priority Data

Jun. 16, 2016 (KR) .................. 10-2016-0075311

(51) Int. Cl.
*H01M 10/44* (2006.01)
*H01M 10/46* (2006.01)
(Continued)

(52) U.S. Cl.
CPC .......... *B60L 11/1829* (2013.01); *B60L 53/38* (2019.02); *G01D 5/20* (2013.01); *G01D 5/2073* (2013.01);
(Continued)

(58) Field of Classification Search
CPC .......... H02J 7/355; H02J 7/0042; H02J 7/025; H02J 5/005; H02J 50/90
(Continued)

(56) References Cited

U.S. PATENT DOCUMENTS 5,498,948 A * 3/1996 Bruni ................ H02J 7/025
320/108
7,026,789 B2 * 4/2006 Bozzone ............ H02J 7/0044
320/108
(Continued)

*Primary Examiner* — Edward Tso
(74) *Attorney, Agent, or Firm* — Mintz Levin Cohn Ferris Glovsky and Popeo, P.C.; Peter F. Corless

(57) ABSTRACT

A coil alignment method performed in a coil alignment apparatus coupled to a VA controller includes: sensing magnetic field intensities induced from a ground assembly (GA) coil through a first auxiliary coil and a second auxiliary coil which are fixedly coupled to a VA coil; comparing a first magnetic field intensity sensed through the first auxiliary coil with a second magnetic field intensity sensed through the second auxiliary coil; moving the VA coil or the GA coil to a position where there is a predetermined difference or less between the first magnetic field intensity and the second magnetic field intensity; and moving at least one of the VA coil and the GA coil in a direction facing each other, so that a center point of the VA coil and a center point of the GA coil are located within a shortest distance of each other or within a certain error range of the shortest distance, while maintaining the predetermined difference or less between the first magnetic field intensity and the second magnetic field intensity.

16 Claims, 17 Drawing Sheets

(51) Int. Cl.
*B60L 11/18* (2006.01)
*H02J 50/90* (2016.01)
*G01D 5/20* (2006.01)
*H04B 5/00* (2006.01)
*H02J 50/12* (2016.01)
*H02J 50/80* (2016.01)
*B60L 53/38* (2019.01)

(52) U.S. Cl.
CPC .............. *H02J 50/12* (2016.02); *H02J 50/80* (2016.02); *H02J 50/90* (2016.02); *H04B 5/0037* (2013.01); *H04B 5/0081* (2013.01)

(58) Field of Classification Search
USPC .......................... 320/104, 108, 109; 307/104
See application file for complete search history.

(56) References Cited

U.S. PATENT DOCUMENTS

| | | | | |
|---|---|---|---|---|
| 8,384,344 | B1 * | 2/2013 | Rogers | H02J 7/00 320/104 |
| 8,466,654 | B2 * | 6/2013 | Cook | H01Q 7/00 320/109 |
| 8,884,581 | B2 * | 11/2014 | Widmer | B60L 11/182 320/108 |

* cited by examiner

COIL ALIGNMENT METHOD FOR ALIGNING A VEHICLE ASSEMBLY COIL WITH A GROUND ASSEMBLY COIL AND ELECTRIC VEHICLE WIRELESS POWER TRANSFER APPARATUS USING THE SAME

CROSS-REFERENCE TO RELATED APPLICATION

This application claims the benefit of priority to Korean Patent Application No. 10-2016-0075311 filed on Jun. 16, 2016 in the Korean Intellectual Property Office (KIPO), the entire contents of which are hereby incorporated by reference as if fully set forth herein.

TECHNICAL FIELD

The present disclosure relates generally to coil alignment methods, and more particularly, to coil alignment methods for aligning a vehicle assembly coil with a ground assembly coil, which are used in a wireless power transfer system, and electric vehicle wireless power transfer apparatuses using the same.

BACKGROUND

An electric vehicle (EV) is a type of vehicle that is driven by a battery powered motor. As a result, the vehicle has fewer pollution sources, such as exhaust gas and noise, than a conventional gasoline engine vehicle, fewer failures, a longer lifespan, and simple driving operation.

EVs are typically classified into a hybrid electric vehicle (HEV), a plug-in hybrid electric vehicle (PHEV), and an electric vehicle (EV) according to the driving source. The HEV has an engine as a main power source and a motor as an auxiliary power source. The PHEV has a motor as a main power source and an engine mainly used when a battery is being discharged. The EV, meanwhile, does not have an engine, and has a motor as its sole driving source.

In order to charge a battery equipped in the EV using a wireless charging method, it may be necessary to couple a primary coil of a charging station with a secondary coil of the EV using magnetic resonance. In order to improve efficiency of wireless charging, it may be necessary to align the primary coil with the secondary coil. In a magnetic resonant wireless power transfer system, if the primary coil and the secondary coil are not aligned, the efficiency of wireless power transfer may degrade drastically.

For example, as shown in FIG. 1, when the EV has a secondary coil (referred to as "Rx coil") magnetically coupled to a primary coil (referred to as "Tx coil") installed on the ground, the secondary coil should be aligned with the primary coil. Otherwise, for example, as the distance (a) increases between a first extension line, extended along the central axis of the Tx coil in the form of a circular ring, and the second extension line, extended along the central axis of the Rx coil in the form of a circular ring, the efficiency of power transfer may decrease drastically. Here, as an example, the diameter of the primary and secondary coil may be assumed to be 300 mm, and the distance (d) between them may be assumed to be 105 mm. As shown in FIG. 2, the efficiency of power transfer (represented with S-parameter S21) in the above-described wireless power transfer system having the primary coil and the secondary coil is drastically reduced from −2.5 dB to −22.5 dB, as the distance (a) between the center axes of the Tx coil and the Rx coil is increased from 0 to 450 mm by 50 mm.

As described above, in an EV wireless power transfer (WPT) system, the alignment between a transmission coil and a reception coil greatly affects the efficiency of the wireless power transfer. Coil alignment may thus become an important requirement for high efficiency wireless power transfer. Accordingly, various research and development related to coil alignment are underway.

Meanwhile, in the WPT system of the EV, the wireless power transfer is performed between the transmission pad installed in the parking area and the reception pad mounted on the EV. Therefore, the coil alignment of the EV WPT system is difficult as compared to cases of mobile devices and charging pads for them. For this reason, a method of performing coil alignment on the basis of a position showing a maximum magnetic field coupling coefficient above a reference value by using an auxiliary coil or the like has been suggested. However, there is still a shortage of effective coil alignment methods applicable to the EV WPT systems. Thus, there is a need for a new coil alignment scheme for the EV WPT systems.

SUMMARY

Accordingly, embodiments of the present disclosure are provided to substantially obviate one or more problems due to limitations and disadvantages of the related art.

Embodiments of the present disclosure provide coil alignment methods for effectively aligning a vehicle assembly coil with a ground assembly coil to achieve superior performance and efficiency in a wireless power transfer system. Embodiments of the present disclosure also provide coil alignment methods for effectively aligning a vehicle assembly coil and a ground assembly coil using at least one auxiliary coil, a magnetic field pattern look-up table, or a combination thereof, and an electric vehicle wireless power transfer system using the same.

According to embodiments of the present disclosure, a coil alignment method performed in a coil alignment apparatus coupled to a vehicle assembly (VA) controller includes: sensing magnetic field intensities induced from a ground assembly (GA) coil through a first auxiliary coil and a second auxiliary coil which are fixedly coupled to a VA coil; comparing a first magnetic field intensity sensed through the first auxiliary coil with a second magnetic field intensity sensed through the second auxiliary coil; moving the VA coil or the GA coil to a position where there is a predetermined difference or less between the first magnetic field intensity and the second magnetic field intensity; and moving at least one of the VA coil and the GA coil in a direction facing each other, so that a center point of the VA coil and a center point of the GA coil are located within a shortest distance of each other or within a certain error range of the shortest distance, while maintaining the predetermined difference or less between the first magnetic field intensity and the second magnetic field intensity.

The moving of the VA coil or the GA coil to the position may include: when a distance from the center point of the VA coil to the first auxiliary coil is equal to a distance from the center point of the VA coil to the second auxiliary coil, equally aligning a first angle formed by a straight line connecting a center point of the first auxiliary coil and the center point of the GA coil and a straight line connecting the center point of the GA coil and the center point of the VA coil with a second angle formed by a straight line connecting a center point of the second auxiliary coil and the center point of the GA coil and a straight line connecting the center point of the GA coil and the center point of the VA coil.

The center point of the VA coil, a center point of the first auxiliary coil, and a center point of the second auxiliary coil may be arranged on a straight line, arranged in a triangle shape on a first plane parallel to a horizontal plane perpendicular to a magnetic center line of the GA coil, arranged in a triangular shape on a second plane intersected with the horizontal plane, or arranged in a triangular shape on a third plane perpendicular to the horizontal plane.

The predetermined difference may be zero or a difference within a predetermined error range of zero.

The moving of the at least one of the VA coil and the GA coil in the direction facing each other may include: transmitting a signal or message for controlling movement of the GA coil from the VA controller to a GA controller coupled to the GA coil when the GA coil is moved.

Furthermore, in accordance with embodiments of the present disclosure, a coil alignment method performed in a coil alignment apparatus coupled to a vehicle assembly (VA) controller includes: sensing magnetic field intensities induced from a ground assembly (GA) coil through a first auxiliary coil and a second auxiliary coil which are coupled to a VA coil at respective relative positions spaced apart from the VA coil by predetermined distances; comparing a first magnetic field intensity sensed through the first auxiliary coil with a second magnetic field intensity sensed through the second auxiliary coil; moving the VA coil or the GA coil to a position where there is a predetermined distance or less between the first magnetic field intensity and the second magnetic field intensity; comparing a first magnetic field pattern at the position where there is a predetermined distance or less between the first magnetic field intensity and the second magnetic field intensity with magnetic field patterns stored in a look-up table; and calculating a distance and a direction between the VA coil and the GA coil based on a second magnetic field pattern that is the same as or the closest to the first magnetic field pattern among the magnetic field patterns stored in the look-up table.

The magnetic field patterns stored in the look-up table may have a normal distribution probability density function shape with a highest value at a center point of the GA coil.

The moving of the VA coil or the GA coil to the position may include: moving at least one of the GA coil and the VA coil in a direction facing each other based on the calculated distance and direction, so that a center point of the VA coil and a center point of the GA coil are located within a shortest distance of each other or within a predetermined error range from the shortest distance.

Furthermore, in accordance with embodiments of the present disclosure, a coil alignment method performed in a coil alignment apparatus coupled to a ground assembly (GA) controller includes: supplying electric power to a GA coil to form a magnetic field when a vehicle enters a wireless charging area; receiving magnetic field intensities sensed at a first auxiliary coil and a second auxiliary coil which are fixedly coupled to a vehicle assembly (VA) coil from a VA controller mounted on the vehicle through the GA controller; moving the GA coil to a position where there is a predetermined difference or less between the magnetic field intensities; and moving the GA coil in a direction facing the VA coil while maintaining the predetermined difference or less between the magnetic field intensities.

The coil alignment method may further include, before the moving the GA coil in a direction facing the VA coil: comparing a first magnetic field pattern at the position where there is a predetermined difference or less between the magnetic field intensities with magnetic field patterns stored in a look-up table; and determining a distance and a direction of the GA coil from the VA coil based on a second magnetic field pattern that is the same as or the closest to the first magnetic field pattern among the magnetic field patterns stored in the look-up table.

The moving of the GA coil in the direction facing the VA coil may be terminated when a center point of the VA coil and a center point of the GA coil are located within a shortest distance of each other or within a predetermined error range from the shortest distance.

Furthermore, in accordance with embodiments of the present disclosure, a coil alignment method performed in a coil alignment apparatus coupled to a vehicle assembly (VA) controller includes: supplying electric power to a VA coil mounted on a vehicle to form a magnetic field after the vehicle enters a wireless charging area; receiving, from a ground assembly (GA) controller, alignment information indicating a movement direction and distance calculated based on magnetic field intensities sensed at a plurality of sensing coils coupled to a GA coil connected to the GA controller at respective positions relative to the GA coil; and moving the VA coil according to the received alignment information.

The receiving of the alignment information and the moving of the VA coil may be repeated until a maximum difference among the magnetic field intensities sensed at the plurality of sensing coils becomes within a predetermined error range.

Furthermore, in accordance with embodiments of the present disclosure, a coil alignment method performed in a coil alignment apparatus coupled to a ground assembly (GA) controller includes: sensing magnetic fields induced in a plurality of sensing coils coupled to a GA coil located in a wireless charging area at respective positions relative to the GA coil from a vehicle entering the wireless charging area; moving, a first time, the GA coil in a direction toward a sensing coil having a maximum magnetic field intensity among the plurality of sensing coils; and moving, a second time, the GA coil toward a sensing coil having a maximum magnetic field intensity among magnetic field intensities sensed through the plurality of sensing coils at a position to which the GA coil is moved the first time.

The moving the second time may be terminated when a maximum difference among the magnetic field intensities sensed through the plurality of sensing coils becomes within a predetermined error range.

The coil alignment method may further include, after the sensing of the magnetic fields: comparing a first magnetic field pattern according to magnetic field intensities sensed at the plurality of sensing coils with magnetic field patterns stored in a look-up table; and determining the direction toward the sensing coil based on a second magnetic field pattern that is the same as or the closest to the first magnetic field pattern among the magnetic field patterns stored in the look-up table.

Furthermore, in accordance with embodiments of the present disclosure, a wireless power transfer apparatus mounted on a vehicle includes: a vehicle assembly (VA) coil mounted on the vehicle; two auxiliary coils which are coupled to the VA coil at respective positions relative to the VA coil; a VA controller that controls power transmission and reception operations through the VA coil, and communicates with a ground assembly (GA) controller through a communication unit; and a coil alignment apparatus coupled to the VA controller. Also, the coil alignment apparatus includes: at least one sensor sensing magnetic field intensities induced in the two auxiliary coils from a GA coil coupled to the GA controller; a comparator comparing the magnetic field intensities; and an actuator coupled to the VA coil. Also, the actuator moves the VA coil to a position where there is a predetermined difference or less between the magnetic field intensities, moves the VA coil in a direction facing the GA coil, and stops movement of the VA coil when a magnetic field intensity induced in the VA coil from the GA coil becomes greater than or equal to a predetermined level.

The predetermined difference may be zero or within a predetermined error range from zero.

Furthermore, in accordance with embodiments of the present disclosure, a wireless power transfer apparatus mounted on a vehicle includes: a vehicle assembly (VA) coil mounted on the vehicle; a plurality of auxiliary coils which are coupled to the VA coil at respective positions relative to the VA coil; a VA controller that is coupled to the VA coil and the plurality of auxiliary coils, and communicates with a ground assembly (GA) controller through a communication unit; and a coil alignment apparatus coupled to the VA controller. Also, the coil alignment apparatus includes: at least one sensor sensing magnetic field intensities induced in the plurality of auxiliary coils from a GA coil coupled to the GA controller; a pattern generator generating a first magnetic field pattern according to the sensed magnetic field intensities; a look-up table storing magnetic field patterns according to magnetic field intensities varying with distances from the GA coil; a pattern comparator comparing the first magnetic field pattern with the magnetic field patterns stored in the look-up table; and an actuator coupled to the VA coil. Also, the coil alignment apparatus moves the VA coil or the GA coil directly or indirectly according to vector information output from the pattern comparator.

Furthermore, in accordance with embodiments of the present disclosure, a wireless power transfer apparatus coupled to a ground assembly (GA) located in a wireless charging area includes: a GA coil of the GA; a plurality of auxiliary coils disposed at respective relative positions spaced apart from the GA coil by predetermined distances; a GA controller that is coupled to the GA coil and the plurality of auxiliary coils, and communicates with the GA controller through a communication unit; and a coil alignment apparatus coupled to the GA controller. Also, the coil alignment apparatus includes: at least one sensor sensing magnetic field intensities induced in the plurality of auxiliary coils from a GA coil coupled to the GA controller; a pattern generator generating a first magnetic field pattern according to the sensed magnetic field intensities; a look-up table storing magnetic field patterns according to magnetic field intensities varying with distances from the GA coil; a pattern comparator comparing the first magnetic field pattern with the magnetic field patterns stored in the look-up table; and an actuator coupled to the VA coil. The coil alignment apparatus moves the VA coil or the GA coil directly or indirectly according to vector information output from the pattern comparator.

BRIEF DESCRIPTION OF DRAWINGS

Embodiments of the present disclosure will become more apparent by describing in detail embodiments of the present disclosure with reference to the accompanying drawings, in which.

Figure 1:
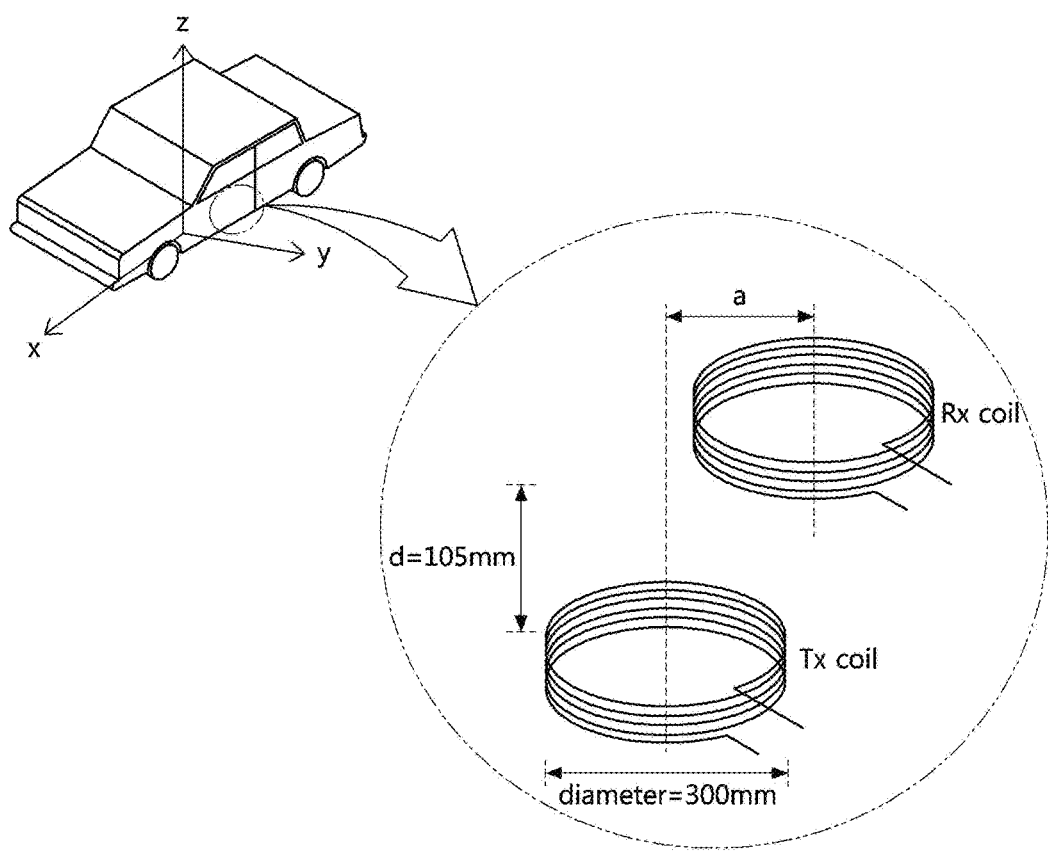
FIG. 1 is a diagram explaining alignment between wireless power transfer coils in a conventional EV.
Figure 2:
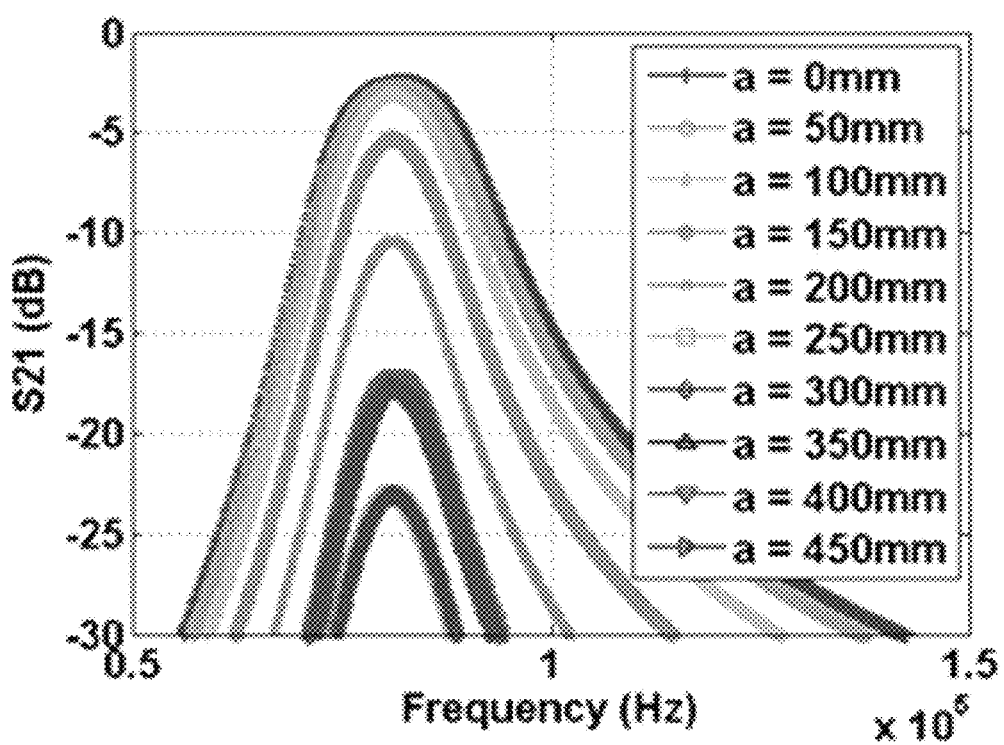
FIG. 2 is a graph illustrating change of wireless power transfer efficiency according to errors of alignment shown in FIG. 1.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment

DETAILED DESCRIPTION OF THE EMBODIMENTS

Embodiments of the present disclosure are disclosed herein. However, specific structural and functional details disclosed herein are merely representative for purposes of describing embodiments of the present disclosure. Embodiments of the present disclosure may be embodied in many alternate forms and should not be construed as limited to embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in the present disclosure are defined as follows.

"Electric Vehicle, EV": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle, PEV": An Electric Vehicle that recharges the on-vehicle primary battery by connecting to the power grid.

"Plug-in vehicle, PV": An electric vehicle rechargeable through wireless charging from an electric vehicle supply equipment (EVSE) without using a physical plug or a physical socket.

"Heavy duty vehicle; H.D. Vehicle": Any four- or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system, WCS": The system for wireless power transfer and control between the GA and VA including alignment and communications. This system transfers energy from the electric supply network to the electric vehicle electromagnetically through a two-part loosely coupled transformer.

"Wireless power transfer, WPT": The transfer of electrical power from the AC supply network to the electric vehicle by contactless means.

"Utility": A set of systems which supply electrical energy and include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

"Smart charging": A system in which EVSE and/or PEV communicate with power grid in order to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which component of a system interwork with corresponding components of the system in order to perform operations aimed by the system. Also, information interoperability may mean capability that two or more networks, systems, devices, applications, or components can efficiently share and easily use information without giving inconvenience to users.

"Inductive charging system": A system transferring energy from a power source to an EV through a two-part gapped core transformer in which the two halves of the transformer, primary and secondary coils are physically separated from one another. In the present disclosure, the inductive charging system may correspond to an EV power transfer system.

"Inductive coupler": The transformer formed by the coil in the GA coil and the coil in the VA coil that allows power to be transferred with galvanic isolation.

"Inductive coupling": Magnetic coupling between two coils. In the present disclosure, the coupling make take place between the GA coil and the VA coil.

"Ground assembly, GA": An assembly on the infrastructure side consisting of the GA coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly, VA": An assembly on the vehicle consisting of the VA coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

"GA controller": The portion of the GA which regulates the output power level to the GA coil based on information from the vehicle.

"VA controller": The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": The vertical distance between the plane of the higher of the top of the litz wire or the top of the magnetic material in the GA coil to the plane of the lower of the bottom of the litz wire or the magnetic material in the VA coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA coil mounted on a vehicle to the ground surface.

"VA coil magnetic surface distance": the distance between the plane of the nearest magnetic or conducting component surface to the lower exterior surface of the VA coil when mounted. This distance includes any protective coverings and additional items that may be packaged in the VA coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g. an electric vehicle) that may be touched and which is not normally energized but which may become energized in case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. The pairing may include the process by which a VA controller and GA controller of a charging spot are correlated. The correlation/association process may include the process of the establishment of a relationship between two peer communication entities.

"Command and control communication": The communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited.

"Low power excitation (LPE)": LPE means a technique of activating the primary device for the fine positioning ad pairing so that the EV can detect the primary device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID basically distinguishes multiple wireless LANs. Therefore, all access points (Aps) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is the name of the network to which you want to connect. It is similar to SSID but can be a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller managing the at least one GA. The GA may comprise at least one wireless communication device. The charging station may mean a place having at least one GA, which is installed in home, office, public place, road, parking area, etc.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

In embodiments according to the present disclosure, the light load driving or light load operation may include, for example, charging the high voltage battery with a charging voltage lower than a predetermined rated voltage in the latter half of charging for the high voltage battery connected to the VA in the WPT system. Also, the light load operation may include a case in which the high-voltage battery of EV is charged at a relatively low voltage and at a low speed by using a low-speed charger such as a household charger.

Hereinafter, embodiments according to the present disclosure will be explained in detail by referring to accompanying figures.

Figure 3:
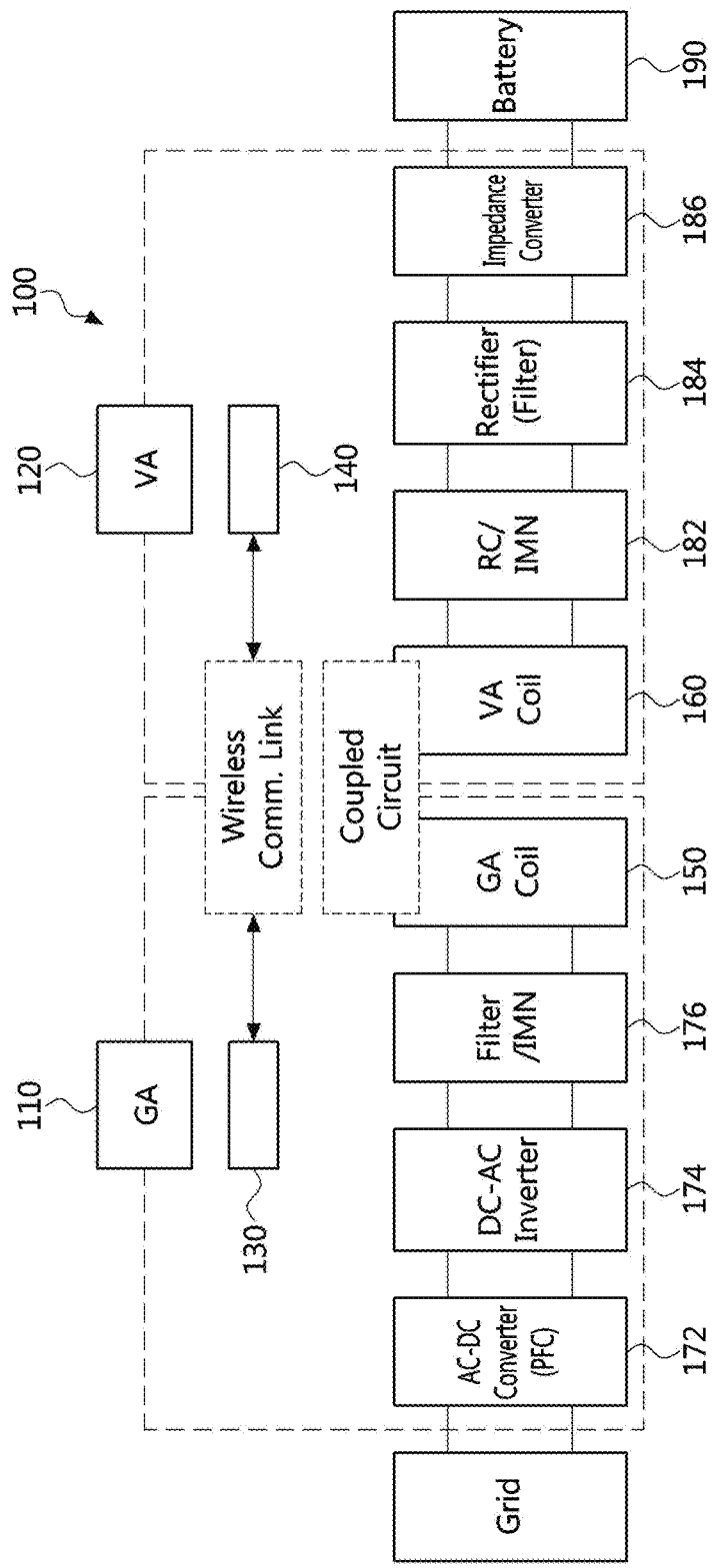
FIG. 3 is a block diagram illustrating a wireless power transfer system using an alignment method for wireless power transfer coils according to embodiments of the present disclosure.

FIG. 3 is a block diagram illustrating a wireless power transfer system using an alignment method for wireless power transfer coils according to embodiments of the present disclosure.

As shown in FIG. 3, a wireless power transfer system 100 according to embodiments of the present disclosure may comprise a ground assembly (GA) 110 and a vehicle assembly (VA) 120.

The GA 110 may include an alternating current to direct current (AC-DC) converter 172 having a power factor correction (PFC) function connected to a grid, a direct current to alternating current (DC-AC) inverter 174, a filter/impedance matching network (IMN) 176, and a GA coil (referred to also as "primary coil") 150. Also, the GA 110 may further include a GA controller 130.

The VA 120 may include a VA coil (referred to also as "secondary coil") 160 forming a magnetic coupled circuit with the GA coil 150, a resonant circuit (RC)/IMN 182, a rectifier/filter 184, and an impedance converter 186. The impedance converter 186 may be coupled to the vehicle's high voltage battery 190. Also, the VA 120 may further include a VA controller 140.

The GA controller 130 and the VA controller 140 may be connected to each other via a wireless communication link. For example, the GA controller 130, the VA controller 140, or a combination thereof may include a coil alignment apparatus which will be described later or perform a function corresponding to the coil alignment apparatus. Also, the GA controller 130 and/or the VA controller 140 may be implemented as a computing device that has a memory and a processor such as a microprocessor or an electronic control unit, and is capable of processing digital signals.

Figure 4:
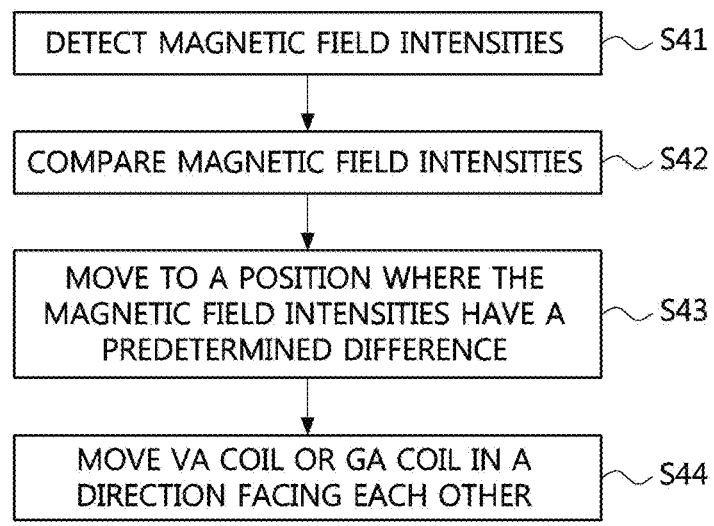
FIG. 4 is a first flow chart explaining a coil alignment method according to embodiments of the present disclosure.

FIG. 4 is a first flow chart explaining a coil alignment method according to embodiments of the present disclosure.

As shown in FIG. 4, a coil alignment method according to embodiments may be performed in a coil alignment apparatus coupled to the VA controller.

The coil alignment apparatus may sense magnetic field intensities induced from the GA coil 150 through a first auxiliary coil and a second auxiliary coil which are fixedly coupled to the VA coil 160 (S41).

Then, the coil alignment apparatus may compare a first magnetic field intensity sensed through the first auxiliary coil with a second magnetic field intensity sensed through the second auxiliary coil (S42).

Then, the coil alignment apparatus may move the VA coil 160 or the GA coil 150 to a position where the first magnetic field intensity and the second magnetic field intensity have a predetermined difference (S43).

Then, the coil alignment apparatus may move at least one of the VA coil 160 and the GA coil 150 in a direction facing each other, so that a first center point of the VA coil 160 and a second center point of the GA coil 150 are located within the shortest distance or within a certain error range from the shortest distance while maintaining the predetermined difference of magnetic field intensities (S44).

Figure 5:
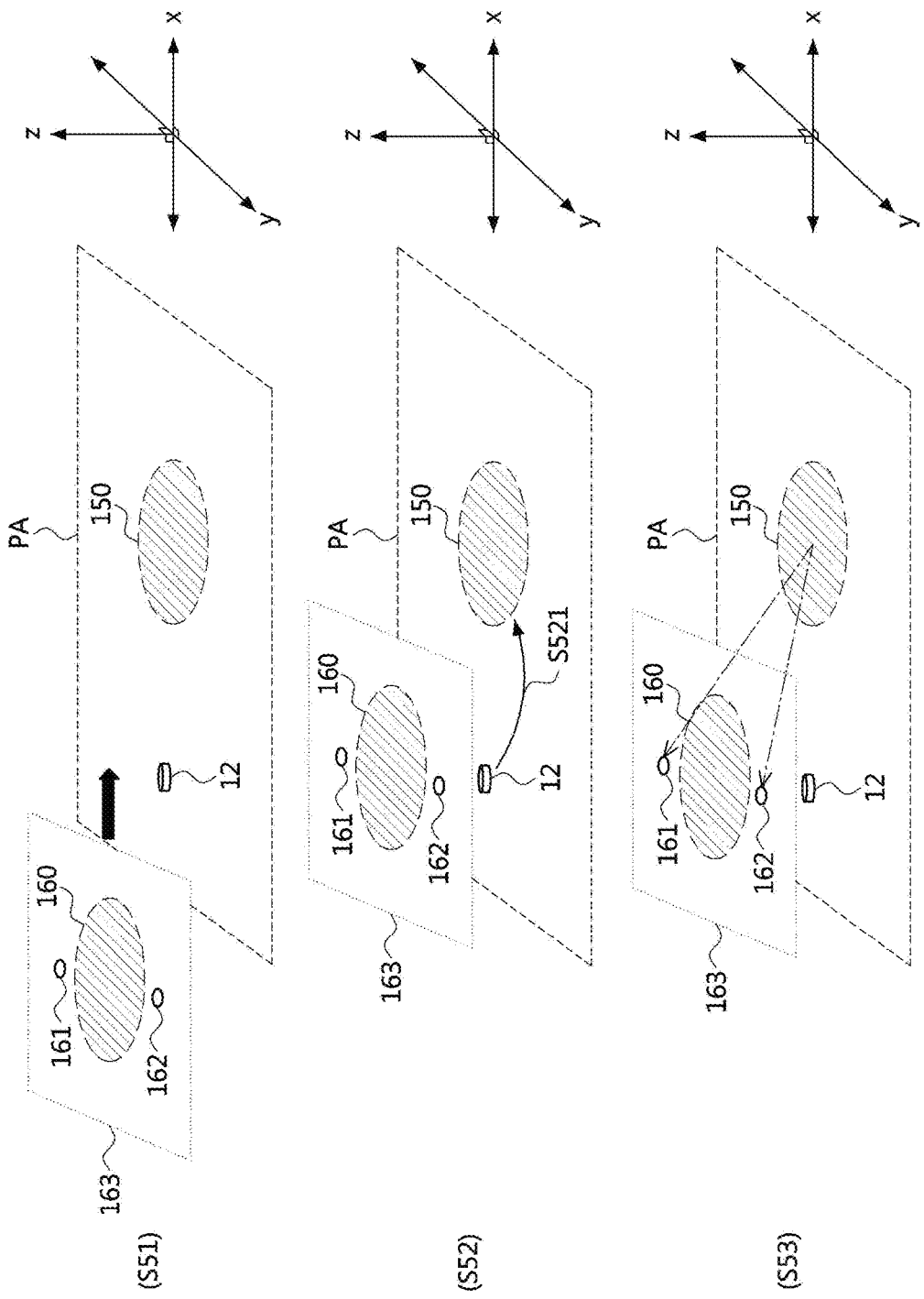
FIGS. 5 and 6 are conceptual diagrams explaining an operation principle of the coil alignment method of FIG. 4.
Figure 6:
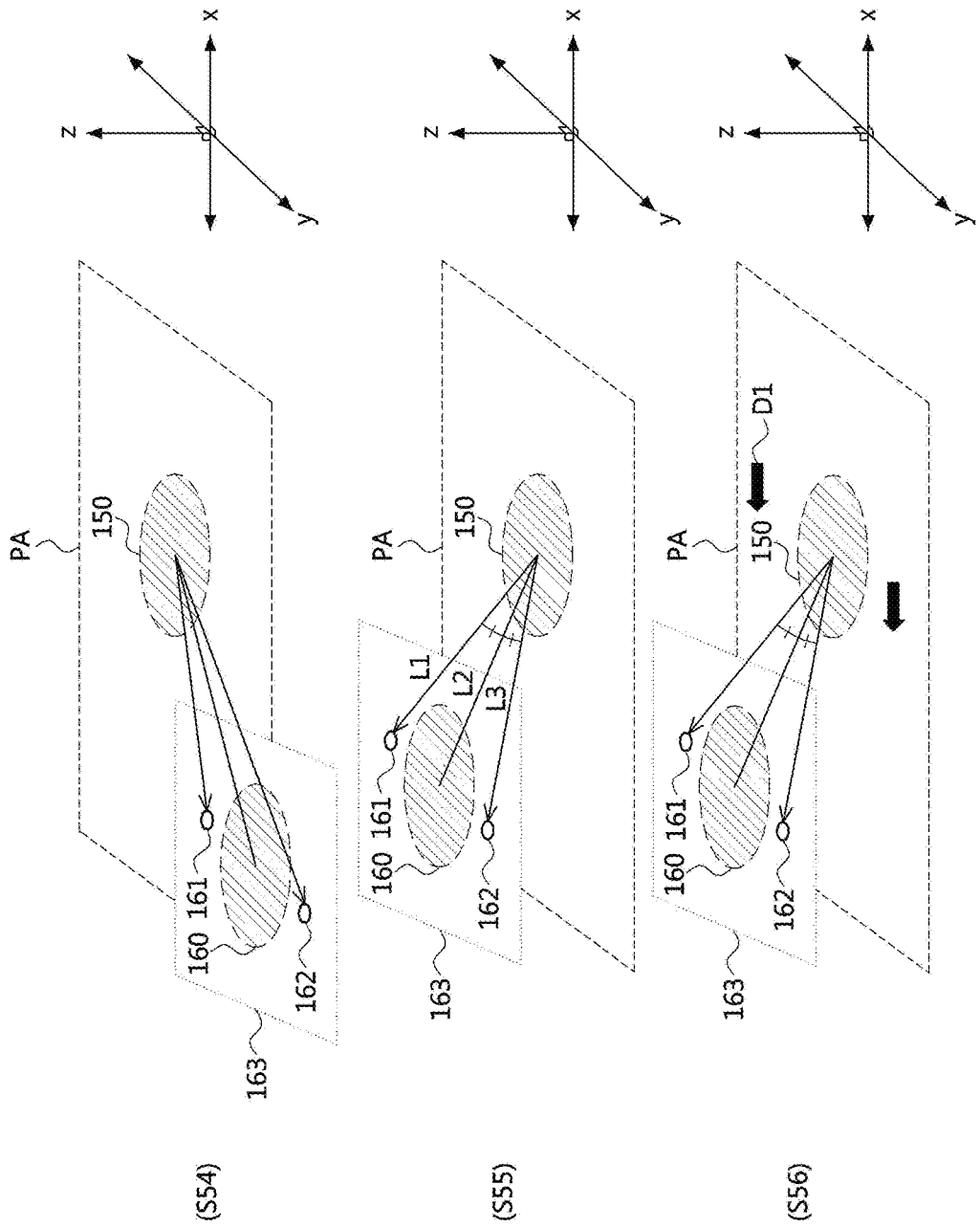

FIGS. 5 and 6 are conceptual diagrams explaining an operation principle of the coil alignment method of FIG. 4.

Referring first to FIG. 5, the VA coil 160, a first auxiliary coil 161 and a second auxiliary coil 162, which are disposed at predetermined positions relative to the VA coil 160 may be mounted on an EV. The battery of the EV may be charged through wireless charging in a wireless charging parking area (PA) in which the GA coil 150 is disposed, by mounting a vehicle-side wireless power reception pad (hereinafter, referred to as a "secondary pad"). The parking area PA may be provided with a sensor 12 for detecting an entry of the EV. The VA coil 160, the first auxiliary coil 161, and the second auxiliary coil 162 may also be integrated with the secondary pad 163 (S51). The auxiliary coils may also be referred to as sensing coils.

When the EV enters the parking area PA, the sensor 12 may transmit a vehicle entry detection signal to the GA controller (S521). In FIG. 5, the vehicle entry detection signal may be transmitted to the GA controller. If the vehicle entry detection signal is input or sensed, the GA controller may begin to operate to power the GA coil 150 to form a magnetic field in the GA coil 150 (S52). In this step, the GA controller may be prepared to provide a power to the GA coil 150 that is smaller than a power used for the wireless power transfer.

When the power is supplied to the GA coil 150, the coil alignment apparatus may detect an electromotive force (i.e., voltage), current, or magnetic field intensity induced in the VA coil 160, the first auxiliary coil 161, and the second auxiliary coil 162 by magnetic induction and/or resonance induction (S53).

Then, as shown in FIG. 6, the coil alignment apparatus may compare the magnetic field intensity (hereinafter, referred to as a "first magnetic field intensity") induced in the first auxiliary coil 161 and the magnetic field intensity (hereinafter, referred to a "second magnetic field intensity") induced in the second auxiliary coil 162 (S54).

Then, the coil alignment apparatus may move the secondary pad 163 to a position where the first magnetic field intensity and the second magnetic field intensity are equal or within a predetermined error range or less (S55).

When a distance from a center point (hereinafter, referred to as a "first center point") of the VA coil 160 to the first auxiliary coil 161 is equal to a distance from the first center point to the second auxiliary coil 162, the step of moving the secondary pad to the above position may include a step of equally aligning a first angle formed by a straight line L1 connecting a center point of the first auxiliary coil 161 and a center point (hereinafter, referred to as a "second center point") of the GA coil 150 and a straight line L2 connecting the first center point and the second center point with a second angle formed by a straight line L3 connecting a center point of the second auxiliary coil 162 and the second center point and the straight line L2. The aligning may be performed as including a predetermined difference, and the predetermined difference may be zero or a difference within a certain error range from zero.

Depending on the implementation, when the distance from the first center point to the first auxiliary coil 161 is different from the distance from the first center point to the second auxiliary coil 162, the coil alignment apparatus may move the secondary pad by a direction and a distance which correspond to a difference between the distances, are in proportion to the first angle and second angle proportional to the difference, or are calculated based on the first angle and the second angle.

Then, the coil alignment apparatus may align the secondary pad 163 with the GA coil 150 by using the first and second auxiliary coils 161 and 162, and then transmit magnetic field intensities sensed at the aligned position (hereinafter, referred to as "first aligned magnetic field intensities") to the GA controller. The GA controller may move a ground-side wireless power transfer pad (hereinafter, referred to as a "primary pad") having the GA coil 150 in a direction D1 facing the VA coil 160 based on the first aligned magnetic field intensities (S56). The first aligned magnetic field intensities may be transmitted from the VA controller to the GA controller as included in a signal or message requesting movement of the GA coil.

For example, the coil alignment apparatus may repeatedly perform the steps of sensing and comparing the magnetic field intensities and moving the VA coil or GA coil, in order to align the VA coil with the GA coil while maintaining the predetermined difference or less (e.g., zero or within an error range from zero) between the magnetic field intensities. That is, the coil alignment apparatus may stop the movement of the VA coil 160 or the GA coil 150, and terminate the alignment process, when a maximum difference among magnetic field intensities sensed at the plurality of auxiliary coils is equal to or less than a predetermined error range and a magnetic field intensity induced in any one of the VA coil, the first auxiliary coil and the second auxiliary coil is equal to or larger than a predetermined reference value.

Meanwhile, the first auxiliary coil 161 and the second auxiliary coil 162 may be arranged such that the center point (i.e., the first center point) of the VA coil 160, the center point of the first auxiliary coil 161, and the center point of the second auxiliary coil 162 are arranged on a straight line, however, embodiments of the present disclosure are not limited thereto. The first auxiliary coil 161 and the second auxiliary coil 162 may be arranged on a first plane parallel to a horizontal plane perpendicular to a center line (i.e., a center line in consideration of a physical form or a symmetric center of a magnetic field) of the GA coil 150 so as to form a triangular shape with the VA coil 160 located at a different height, arranged on a second plane intersected with the horizontal plane so as to form a triangular shape with the VA coil 160 located at a different height, or arranged in a form of a vertical line on a third plane perpendicular to the horizontal plane.

Figure 7:
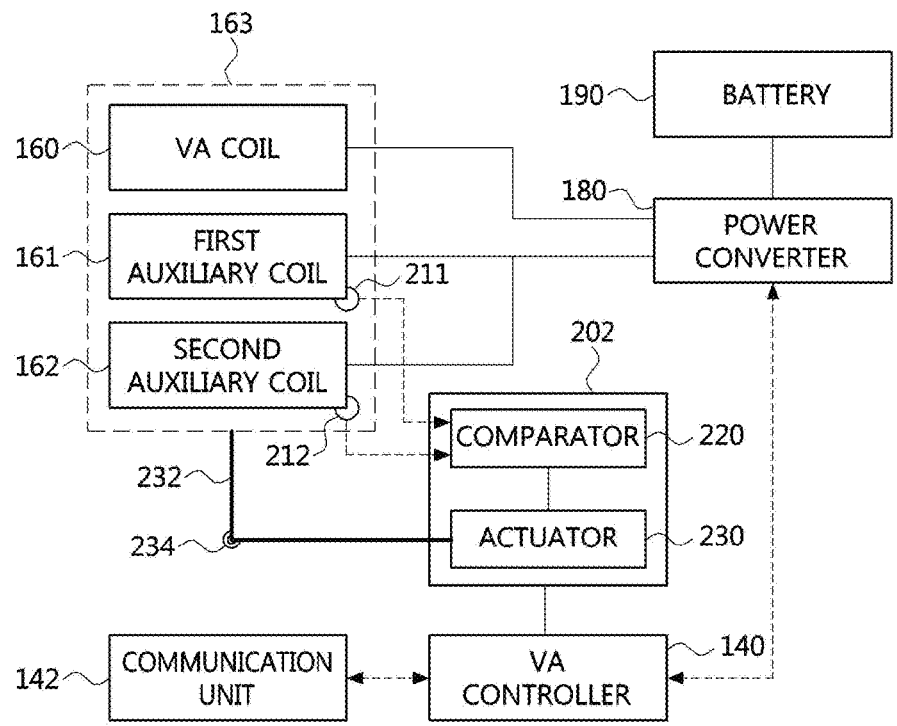
FIG. 7 is a block diagram illustrating an electric vehicle wireless power transfer apparatus using the coil alignment method of FIG. 4 according to embodiments of the present disclosure.

FIG. 7 is a block diagram illustrating an electric vehicle wireless power transfer apparatus using the coil alignment method of FIG. 4 according to embodiments of the present disclosure.

As shown in FIG. 7, an electric vehicle (EV) wireless power transfer apparatus (hereinafter, referred to as a "WPT apparatus") using the coil alignment method according to embodiments of the present disclosure as a WPT apparatus mounted in an EV, may comprise the VA controller 140, the VA coil 160, the first auxiliary coil 161, the second auxiliary coil 163, the power converter 180, and the coil alignment apparatus coupled to the VA controller 140.

The VA controller 140 may control power reception or power transmission operations through the VA coil, and be connected to the GA controller through a communication unit 142 to transmit and receive signals, messages, and the like. The VA coil 160 may be embedded in the secondary pad 163, and the first auxiliary coil 161 and the second auxiliary coil 162 may be disposed in the secondary pad 163 with a predetermined positional relationship. Also, the power converter 180 may include a resonant circuit/IMN (see 182 in FIG. 3), a rectifier/filter, and an impedance converter, and be connected to a battery 190 embedded in the EV.

The coil alignment apparatus may include sensors 211 and 212 for sensing magnetic field intensities applied to the first and second auxiliary coils 161 and 162, a comparator 220 for comparing the sensed magnetic field intensities, and an actuator 230 coupled to the VA coil 160 or the secondary pad 163 having the VA coil 160.

Each of the sensors 211 and 212 may include a magnetic field measurement sensor, such as a hall sensor, coupled to each of the auxiliary coils. The signals sensed by the sensors 211 and 212 or the sensed results may be input to the comparator 220.

Depending on the implementation, the coil alignment apparatus may sense the magnetic field intensities in the auxiliary coils through the power converter 180 or through the VA controller 140 coupled to a sensor installed in the power converter 180.

According to output signals of the comparator 220 or control signals of the VA controller 140, the actuator 230 may move the VA coil 160 or the secondary pad 163 to a position where magnetic field intensities of the auxiliary coils 161 and 162 have a predetermined difference, move the VA coil 160 in the direction facing the GA coil while maintaining the predetermined difference, and then stop movement of the secondary pad 163 when a magnetic field intensity induced in at least one of the VA coil 160, the first auxiliary coil 161, and the second auxiliary coil 162 from the GA coil becomes equal to or greater than a predetermined level. The predetermined difference may be zero or within a predetermined error range.

The actuator 230 may be connected to the secondary pad 163 via an actuating arm 232. A two-dimensional or three-dimensional rotatable joint part 234 may be coupled to the middle of the actuating arm 232, and the actuator 230 may move the secondary pad 163 in a two-dimensional or three-dimensional space through such the configuration.

The comparator 220 and the actuator 230 may be installed in the EV as being accommodated in a single housing 202. Also, the secondary pad 163 connected to the actuator 230 may further include an elastic support structure which can be extended or retracted from the EV in response to a force of the actuator 230 in addition to the connection structure with the actuator 230.

In the above-described example, the coil alignment apparatus including the comparator 220 and the actuator 230 is described as a separate device from the VA controller 140, but embodiments of the present disclosure are not limited to such the configuration. That is, components such as the comparator 220 and the like may be implemented with some comparison functional units mounted on the VA controller 140 or with some components of the VA controller performing functions corresponding to these functional units.

Figure 8:
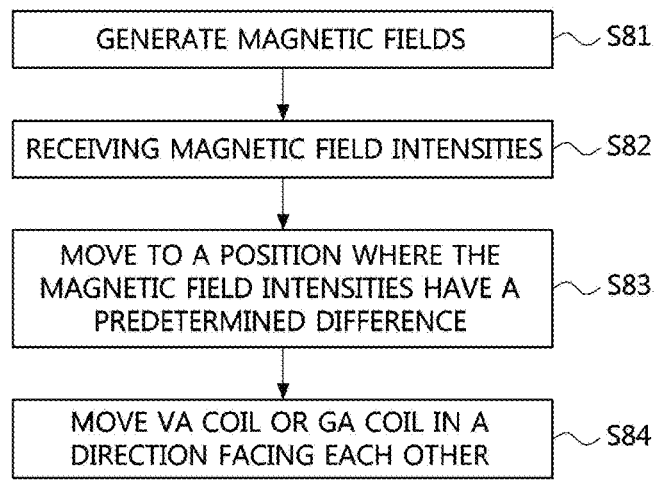
FIG. 8 is a second flow chart explaining a coil alignment method according to embodiments of the present disclosure.

FIG. 8 is a second flow chart explaining a coil alignment method according to embodiments of the present disclosure.

As shown in FIG. 8, a coil alignment method according to embodiments of the present disclosure may be performed by a coil alignment apparatus coupled to the VA controller. However, the coil alignment method may differ from the coil alignment method of FIG. 4 in that auxiliary coils disposed on the primary pad are used. This structure is substantially similar to the structure illustrated in FIG. 5 except that roles of the primary pad and the secondary pad are reversed. Thus, illustration thereof is omitted in order to avoid redundancy.

First, the coil alignment apparatus may generate a magnetic field by supplying electric power to the VA coil mounted on the EV after the EV enters the wireless charging area, such as, for example, a wireless charging parking area (S81). Here, in the wireless charging parking area, the GA coil (see 150 in FIG. 5), a first auxiliary coil and a second auxiliary coil spaced apart from the GA coil by a predetermined distance may be disposed. The GA coil, the first auxiliary coil, and the second auxiliary coil may be integrally disposed on the primary pad.

Then, the coil alignment apparatus may receive, from the GA controller, magnetic field intensities sensed by the plurality of sensing coils (corresponding to the auxiliary coils), which are coupled to the GA coil at respective positions relative to the GA coil (S82). Also, the coil alignment apparatus may calculate a movement direction and distance based on the received magnetic field intensities. The movement direction and distance may be calculated so that the magnetic field intensities sensed by the two auxiliary coils have a predetermined difference. According to the implementation, alignment information including the movement direction and distance may be calculated by the GA controller and then transmitted to the VA controller or the coil alignment apparatus.

Then, the coil alignment apparatus may move the secondary pad to a position (first alignment position) where the magnetic field intensities sensed at the two sensing coils have the predetermined difference (S83). In addition, although the coil alignment apparatus is required to have a more complicated configuration, the coil alignment apparatus may control movement of the primary pad so that the primary pad moves to a position where the magnetic field intensities at the two sensing coils has a predetermined difference.

Then, the coil alignment apparatus may move the VA coil in a direction facing the GA coil until the VA coil or the secondary pad having the VA coil reaches from the first alignment position to a second alignment position having a magnetic field intensity equal to or higher than a predetermined reference value (S84).

Also, the coil alignment apparatus may operate to move the GA coil from its current position to a position (an alignment position) facing the first alignment position in the vertical or gravitational direction, depending on the implementation. To this end, the coil alignment apparatus may transmit a relevant signal or message to the GA controller.

In the above-described example, the coil alignment apparatus may perform repeatedly the steps of receiving the alignment information (e.g., magnetic field intensities sensed at the sensing coils) and moving the VA coil in order to move the VA coil while maintaining a straight path (i.e., a path on a plane including a straight line connecting center lines of the VA coil and the GA coil) via the first alignment position. That is, the coil alignment apparatus may stop moving the VA coil when a maximum difference between the magnetic field intensities of the plurality of sensing coils is equal to or less than a predetermined error range, and the magnetic field intensity induced in any one of the GA coil, the first auxiliary coil, and the second auxiliary coil becomes equal to or larger than a predetermined reference value, and terminate the coil alignment process with the coils positioned at that time.

Figure 9:
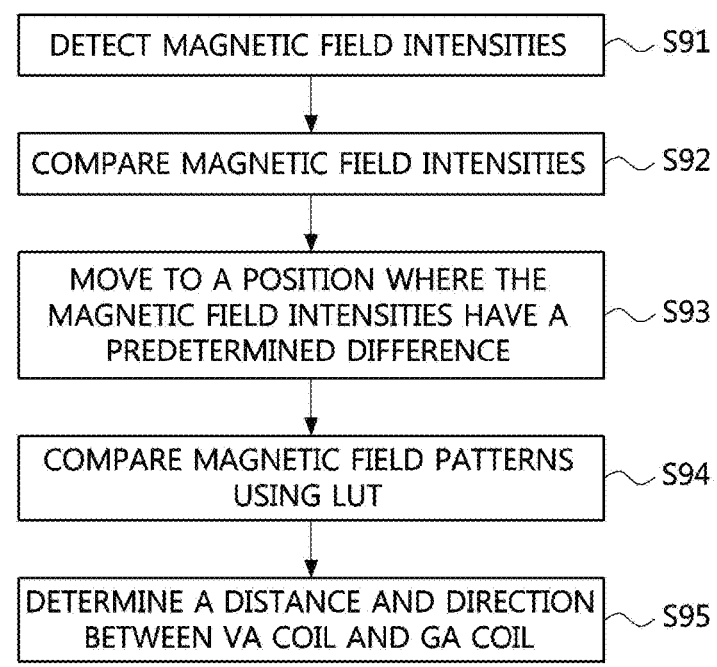
FIG. 9 is a third flow chart explaining a coil alignment method according to embodiments of the present disclosure.

FIG. 9 is a third flow chart explaining a coil alignment method according to embodiments of the present disclosure.

As shown in FIG. 9, a coil alignment method according to the present embodiment may be performed by a coil alignment apparatus that is coupled to the VA controller and uses a look-up table (also referred to as a "LUT").

First, the coil alignment apparatus may sense magnetic field intensities from the GA coil through the first and second auxiliary coils, which are respectively coupled to the VA coil at respective relative positions spaced apart from the VA coil by predetermined distances (S91).

Then, the coil alignment apparatus may compare a first magnetic field intensity sensed through the first auxiliary coil with a second magnetic field intensity sensed through the second auxiliary coil (S92).

Then, the coil alignment apparatus may move the VA coil or the GA coil to a position where the first magnetic field intensity and the second magnetic field intensity have a predetermined difference (S93).

Then, the coil alignment apparatus may compare a first magnetic field pattern at the position having the predetermined difference with magnetic field patterns which are previously stored in the LUT (S94).

Then, the coil alignment apparatus may determine a distance and direction between the VA coil and the GA coil based on a second magnetic field pattern which is the same as or the most similar to the first magnetic field pattern among the magnetic field patterns stored in the LUT (S95).

Then, based on the distance and direction determined in the above step, one or more of the VA coil and the GA coil may be moved in a direction facing each other such that the center point of the VA coil and the center point of the GA coil are located within the shortest distance of each other or within a certain error range from the shortest distance.

Figure 10:
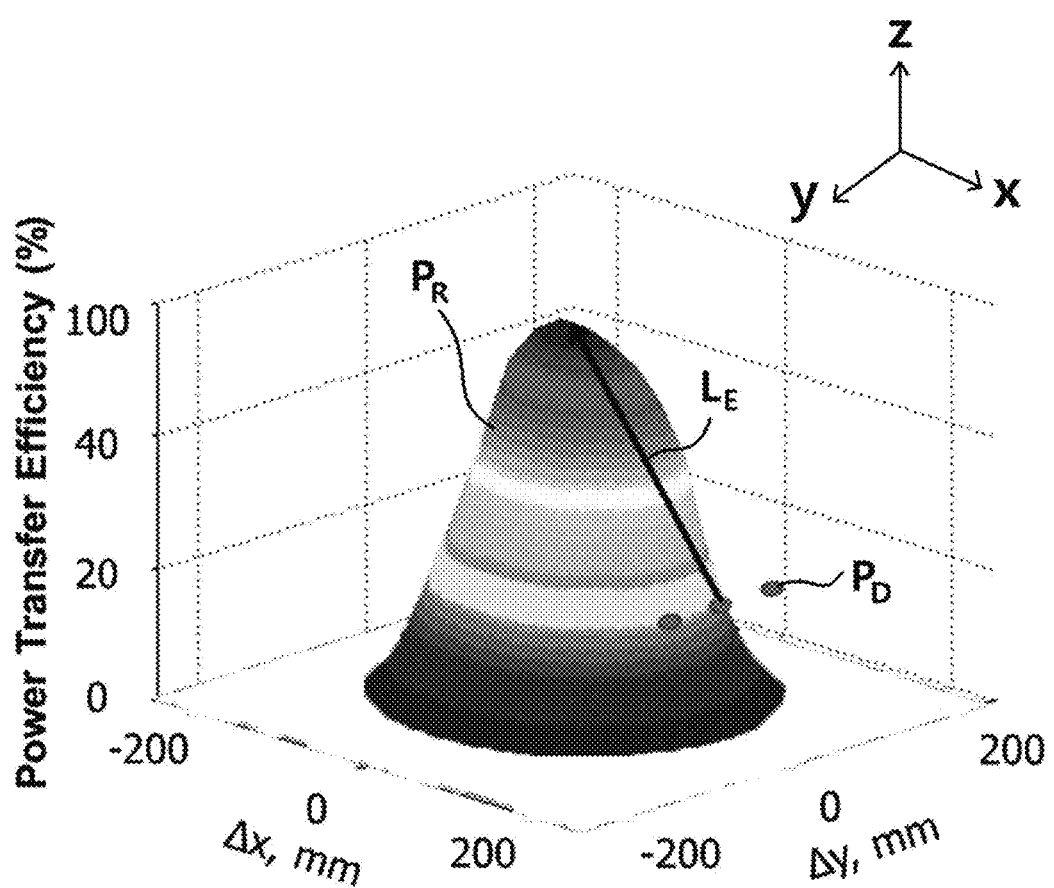
FIG. 10 is a diagram explaining magnetic field patterns stored in a look-up table used in the coil alignment method of FIG. 9.

FIG. 10 is a diagram explaining magnetic field patterns stored in a look-up table used in the coil alignment method of FIG. 9.

As shown in FIG. 10, the LUT may store pattern information on the magnetic field patterns whose magnetic field intensities vary in a plurality of concentric shapes when viewed on the x-y plane according to the distance from the center of the GA coil. The pattern information may include different magnetic field intensity information depending on the distance and direction from the center of the GA coil. Accordingly, when the magnetic field intensities are sensed by any one of the VA coil 160, the first auxiliary coil 161, and the second auxiliary coil 162, or by preferably two or more of them, a vector $L_E$ indicating the direction and distance from the center of the VA coil 160 to the center of the GA coil may be calculated.

The magnetic field patterns stored in the LUT may have a normal distribution probability density function shape $P_R$ with the highest value at the center point of the GA coil. That is, the LUT may store pattern information on the magnetic field patterns.

Figure 11:
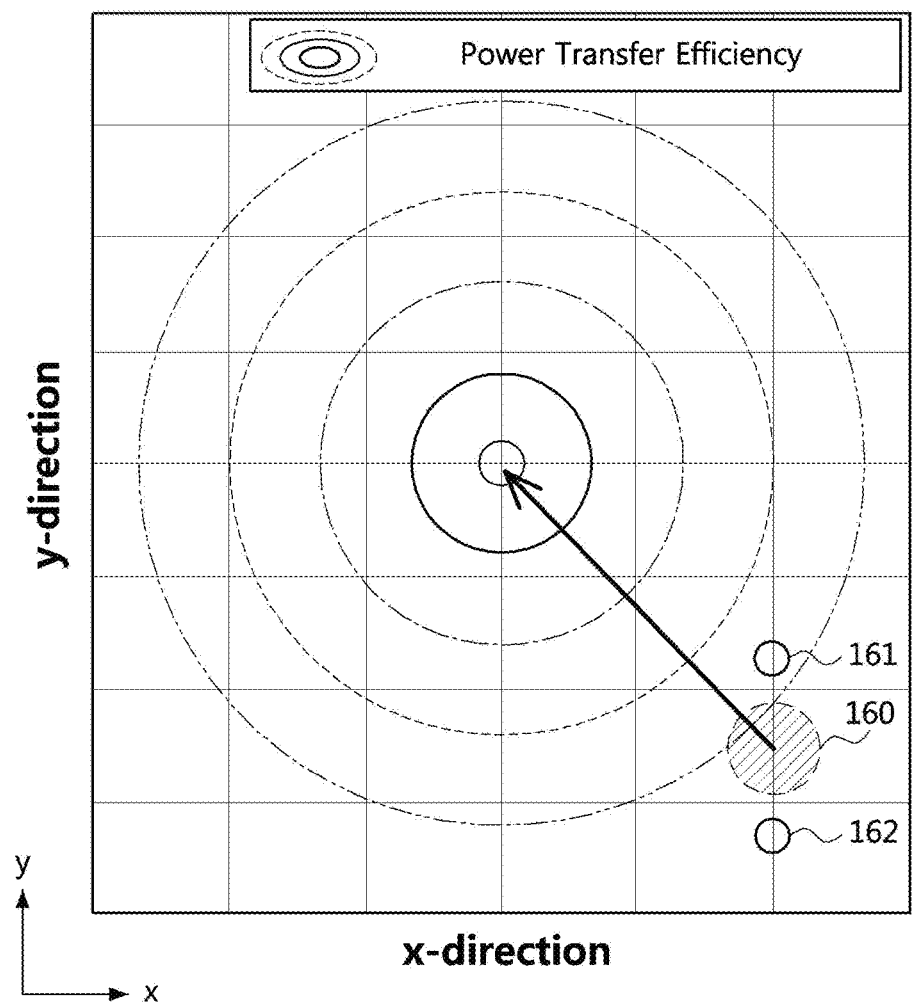
FIGS. 11 to 13 are diagrams illustrating arrangements of auxiliary coils used in the coil alignment method of FIG. 9.
Figure 12:
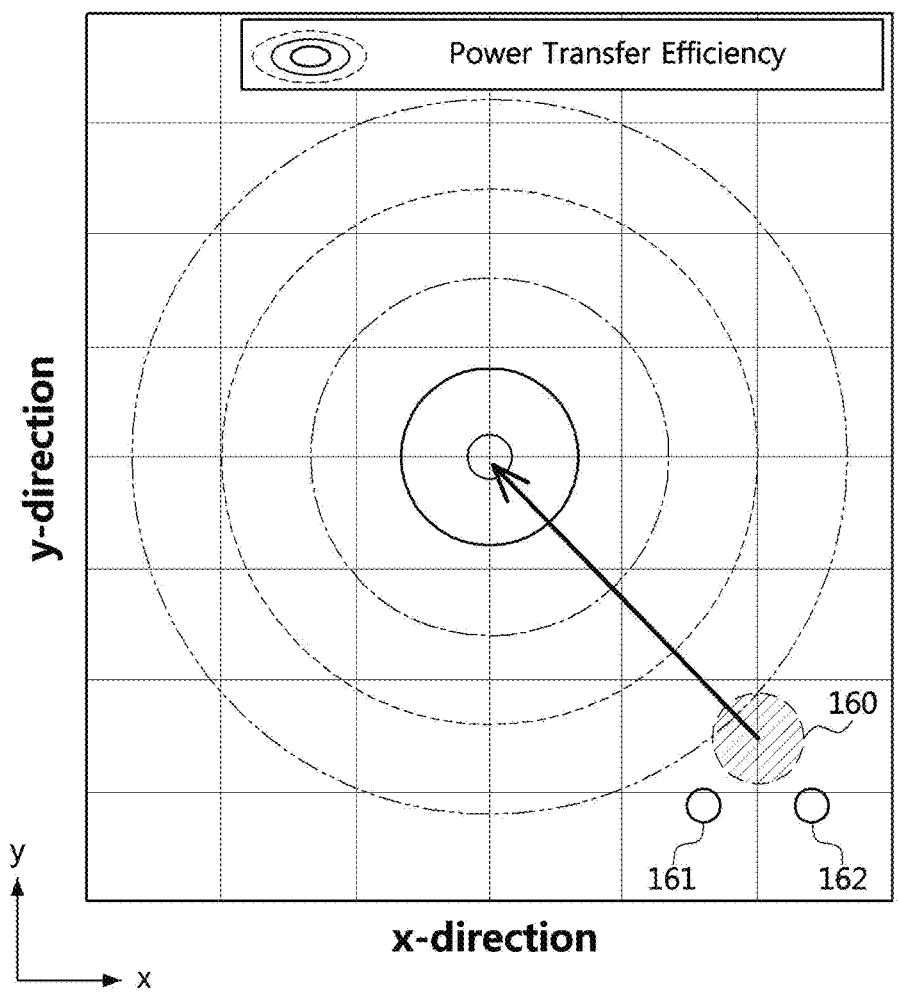
Figure 13:
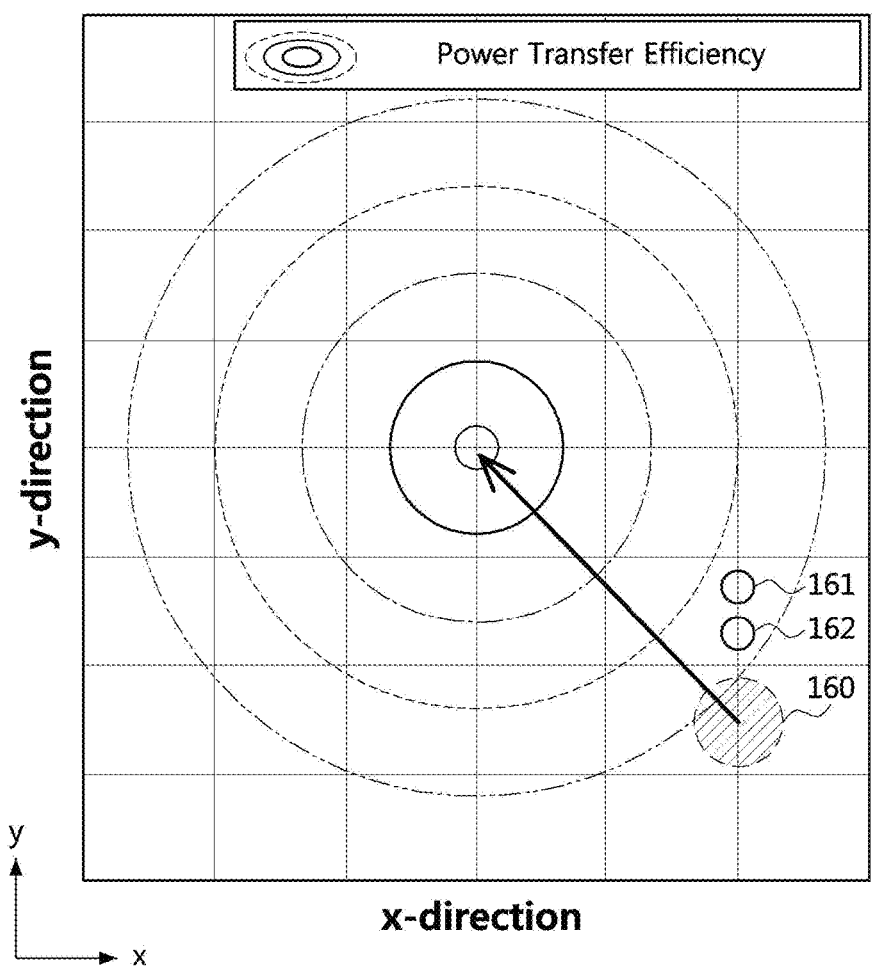

FIGS. 11 to 13 are diagrams illustrating arrangements of auxiliary coils used in the coil alignment method of FIG. 9.

Referring first to FIG. 11, according to an arrangement, the VA coil 160, the first auxiliary coil 161, and the second auxiliary coil 162 may be arranged in a shape where their centers are disposed in a straight line on the same plane parallel to a x-y plane on which the GA coil is placed and the magnetic field intensity varies in a plurality of concentric circles in accordance with the distance from the center of the GA coil. Here, the magnetic field intensity may have an inverse relationship in which the power transfer efficiency decreases as the distance increases.

Referring next to FIG. 12, according to another arrangement, the VA coil 160, the first auxiliary coil 161, and the second auxiliary coil 162 may be arranged such that the centers of the coils are in a triangular shape on the same plane parallel to the x-y plane.

Referring next to FIG. 13, according to yet another arrangement, the VA coil 160, the first auxiliary coil 161, and the second auxiliary coil 162 may be arranged such that the first auxiliary coil 161 and the second auxiliary coil 162 are sequentially arranged in the radial direction on one side of the VA coil 160 in the same plane parallel to the x-y plane.

Figure 14A:
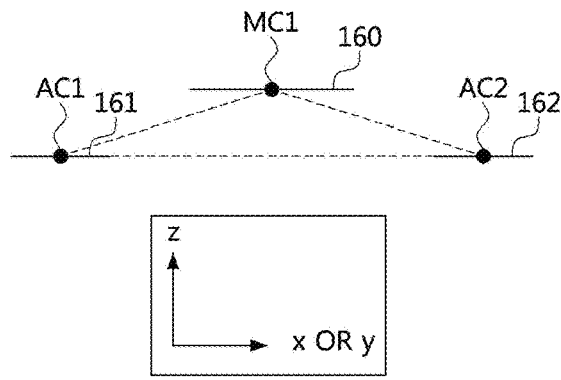
FIGS. 14A and 14B are diagrams illustrating other arrangements of auxiliary coils used in the coil alignment method of FIG. 9.
Figure 14B:
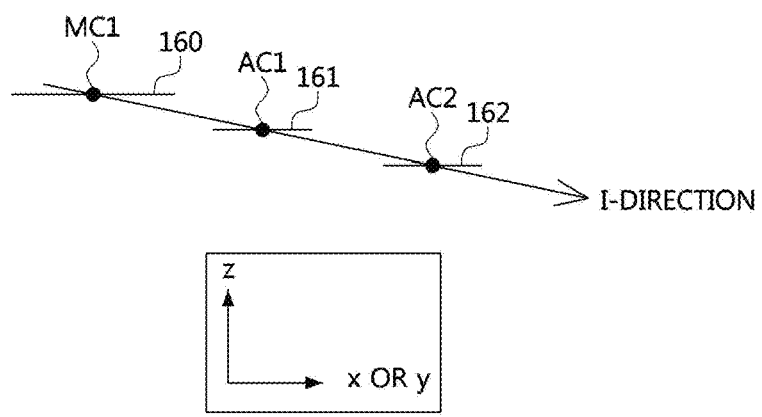

FIGS. 14A and 14B are diagrams illustrating other arrangements of auxiliary coils used in the coil alignment method of FIG. 9.

According to FIGS. 14A and 14B, the VA coil 160, the first auxiliary coil 161, and the second auxiliary coil 162 may not be arranged on the same plane parallel to the x-y plane.

Referring first to FIG. 14A, the first auxiliary coil 161 and the second auxiliary coil 162 may be arranged on a second plane different from a first plane intersected with the center point MC1 of the VA coil 160 in a z-direction perpendicular to the x-y plane. The center point AC1 of the first auxiliary coil 161 and the center point AC2 of the second auxiliary coil 162 may be placed on the second plane. Also, the second plane may be disposed at a position lower than the first plane in the z-direction.

Also, referring next to FIG. 14B, the center point AC1 of the first auxiliary coil 161 may be arranged on the second plane different from the first plane intersected with the center point MC1 of the VA coil 160 in the z-direction perpendicular to the x-y plane, and the center point AC2 of the second auxiliary coil 162 may be arranged on a third plane different from the first plane and the second plane. In this case, depending to the implementation, the center points MC1, AC1, and AC2 may be disposed in a straight line extending toward a predetermined direction (e.g., I-direction).

As described above, as an arrangement structure of the VA coil 160, the first auxiliary coil 161, and the second auxiliary coil 162 for the coil alignment method according to the present disclosure, an arrangement structure in which the auxiliary coils are placed in predetermined relative positions not in symmetrical or regular positions may be used.

According to the above-described example, the center point of the VA coil, the center point of the first auxiliary coil, and the center point of the second auxiliary coil may be arranged on a straight line, arranged in a triangular shape on the first plane parallel to the horizontal plane perpendicular to a magnetic center line of the GA coil, arranged in a triangular shape on the second plane intersecting the horizontal plane, or arranged in a vertical line or triangular shape on the third plane perpendicular to the horizontal plane.

Figure 15:
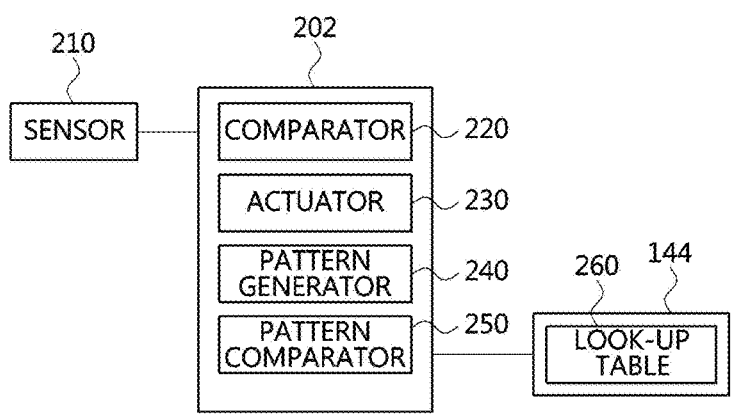
FIG. 15 is a block diagram illustrating a coil alignment apparatus performing the coil alignment method of FIG. 9.

FIG. 15 is a block diagram illustrating a coil alignment apparatus performing the coil alignment method of FIG. 9.

As shown in FIG. 15, a coil alignment apparatus according to embodiments of the present disclosure may be coupled to a WPT apparatus mounted on an EV, and comprise at least one sensor 210, a comparator 220, an actuator 230, a pattern generator 240, a pattern comparator 250, and a look-up table 260. The comparator 220, the actuator 230, the pattern generator 240, and the pattern comparator 250 may be implemented as being accommodated in a single housing 202. Depending on the implementation, the comparator 220, the pattern generator 240, and the pattern comparator 250 may be implemented as part or function of the VA controller. The at least one sensor 210 may be coupled to the comparator 220 and the pattern comparator 250 may be coupled to a storage device or memory 144 where the look-up table 260 is stored.

The sensor 210, the comparator 220, and the actuator 230 may be substantially the same as those of the coil alignment apparatus of FIG. 7, so that detailed description thereof will be omitted.

The pattern generator 240 may generate a first magnetic field pattern at a current position of the secondary pad based on magnetic field intensities sensed at the VA coil, the first auxiliary coil, and the second auxiliary coil. Depending on the implementation, the pattern generator 240 may generate the first magnetic field pattern based on magnetic field intensities of at least one of the VA coil, the first auxiliary coil, and the second auxiliary coil at a position (a first alignment position) to which the secondary pad has been moved according to the result of comparing two magnetic field intensities of the first auxiliary coil and the second auxiliary coil.

The pattern comparator 250 may compare the first magnetic field pattern and magnetic field patterns stored in the LUT 260 to select a second magnetic field pattern that is substantially same as or closest to the first magnetic field pattern within a predetermined error range. The pattern comparator 250 may output position information corresponding to the selected second magnetic field pattern. The position information may include relative vector information. The coil alignment apparatus may calculate a direction and distance of the VA coil toward the center of the GA coil based on the output from the pattern comparator 250 or the position information.

For example, the coil alignment apparatus may sense the magnetic field intensities at the plurality of auxiliary coils from the GA coil connected to the GA controller through the sensor, generate the first magnetic field pattern due to the sensed magnetic field intensities, compare the first magnetic field pattern and magnetic field patterns, which reflect magnetic field intensities varying with the distance from the GA coil and are stored in the LUT 260, through the pattern comparator 250, and align the VA coil with the GA coil through the actuator 230 coupled to the VA coil according to the result of the comparison.

Although the coil alignment apparatus connected to the VA controller has been described in the above manner, embodiments of the present disclosure are not limited to such a configuration, but may be implemented as a coil alignment apparatus connected to the GA controller.

In the above-described case, the coil alignment apparatus connected to the GA controller may generate a magnetic field by supplying power to the GA coil when an EV enters a wireless charging parking area, receive magnetic field intensities sensed by the first auxiliary coil and second auxiliary coil fixedly coupled to the VA coil from the VA controller through the GA controller, move the GA coil to a position where the magnetic field intensities of the auxiliary coils have a predetermined difference, and move the GA coil in a direction facing the VA coil while maintaining the predetermined difference within the error range.

Also, the coil alignment apparatus may compare the first magnetic field pattern at the position having the predetermined difference with the magnetic field patterns stored in the look-up table. Also, the coil alignment apparatus may determine a direction and distance of the GA coil from the VA coil based on a second magnetic field pattern that is the same as or closest to the first magnetic field pattern among the magnetic field patterns stored in the look-up table.

Figure 16:
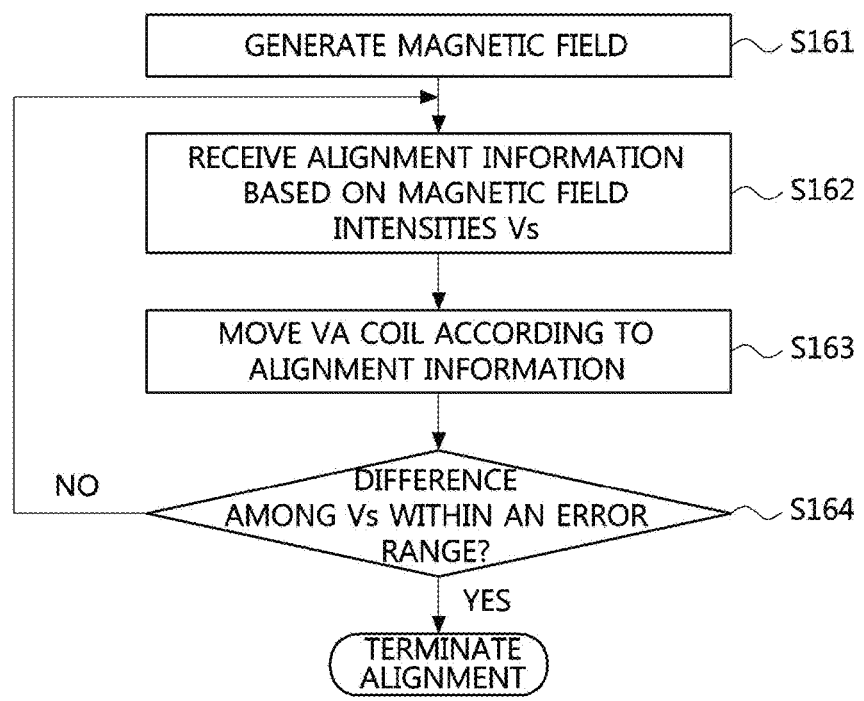
FIG. 16 is a fourth flow chart explaining a coil alignment method according to embodiments of the present disclosure.

FIG. 16 is a fourth flow chart explaining a coil alignment method according to embodiments of the present disclosure.

As shown in FIG. 16, the coil alignment method according to embodiments of the present disclosure may be performed in a coil alignment apparatus mounted on an EV by using a GA coil (see 150 in FIG. 17) and a plurality of sensing (auxiliary) coils (see 151 to 154 in FIG. 17) disposed around the GA coil 150.

When the EV enters the wireless charging parking area, the coil alignment apparatus may generate a magnetic field in the VA coil 160 (S161). Then, alignment information based on the magnetic field intensities $V_S$ sensed by the plurality of sensing coils may be received from the GA controller (S162). Then, the VA coil 160 may be moved according to the alignment information (S163). Then, the coil alignment apparatus may repeat the step of receiving the alignment information and the step of moving the VA coil. The iterative operations may be completed when a maximum difference of the magnetic field intensities sensed by the plurality of sensing coils becomes below a predetermined error range.

Figure 17:
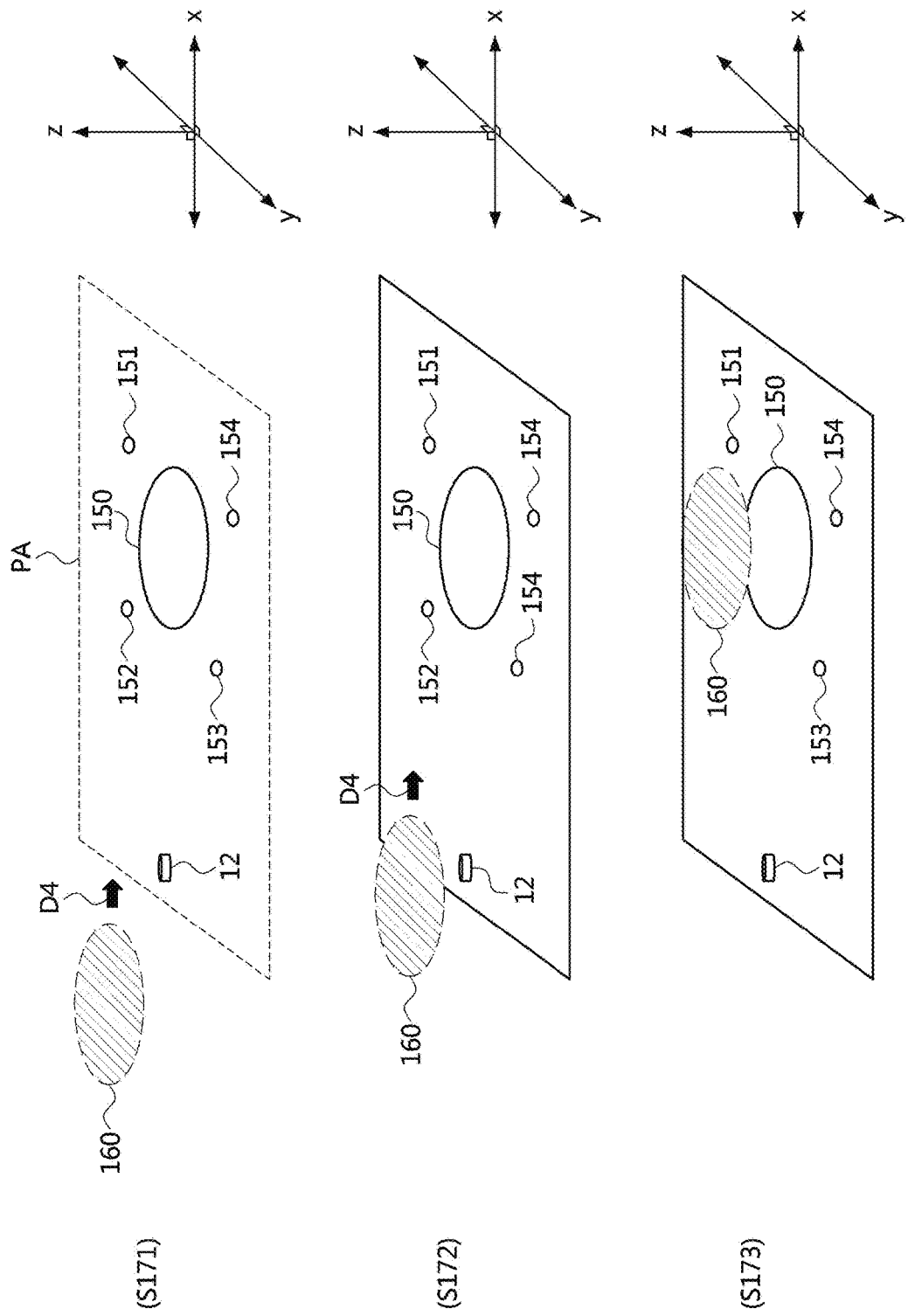
FIG. 17 is a conceptual diagram explaining an operation principle of the coil alignment method of FIG. 16.

FIG. 17 is a conceptual diagram explaining an operation principle of the coil alignment method of FIG. 16.

As shown in FIG. 17, an EV may be detected by a sensor 12 installed in the parking area (S171). When the EV is detected, the sensor 12 may transmit an instruction signal (which may correspond to a vehicle entry detection signal) to initiate a low power transmission of the GA coil 150 and operate the plurality of sensing coils 151 to 154 to a GA controller or a ground-side coil alignment apparatus coupled to the GA controller.

Then, the vehicle-side coil alignment apparatus may monitor whether a magnetic field from the VA coil 160 is detected through the plurality of sensing coils 151, 152, 153, and 154 around the GA coil 150.

Then, the coil alignment apparatus may compare magnetic field intensities sensed by the plurality of sensing coils 151 to 154 so as to track a position of a sensing coil at which the largest magnetic field is detected. The coil alignment apparatus may move the VA coil so that the magnetic field intensities sensed by the plurality of sensing coils become equal. If the magnetic field intensities sensed by the plurality of sensing coils are equal or have a maximum difference within a predetermined error range, the coil alignment apparatus may terminate the alignment.

Depending on the implementation, the coil alignment apparatus may request movement of the primary pad including the GA coil to the GA controller so that the magnetic field intensities sensed at the plurality of sensing coils are equal.

Figure 18:
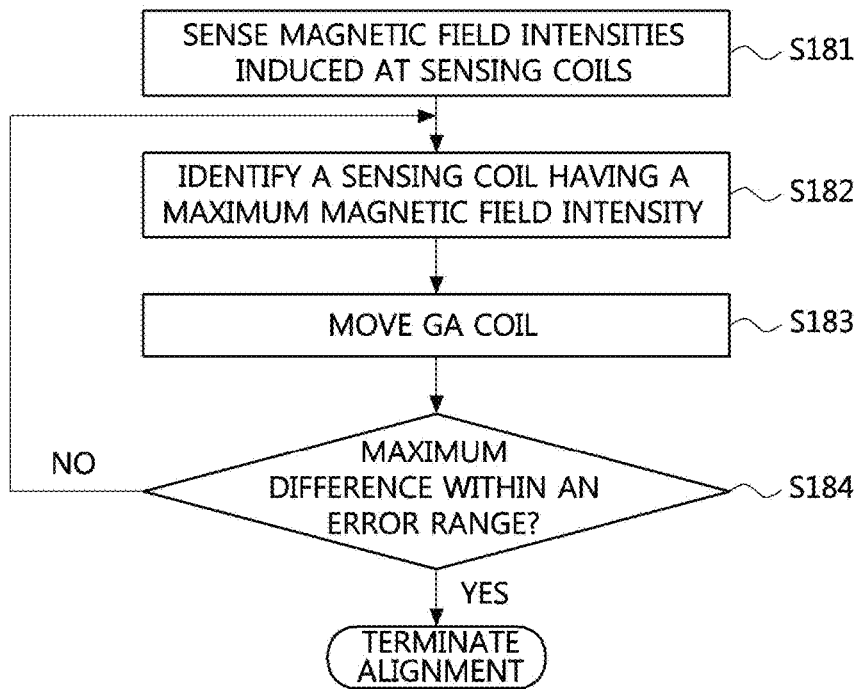
FIG. 18 is a fifth flow chart explaining a coil alignment method according to embodiments of the present disclosure.
Figure 19:
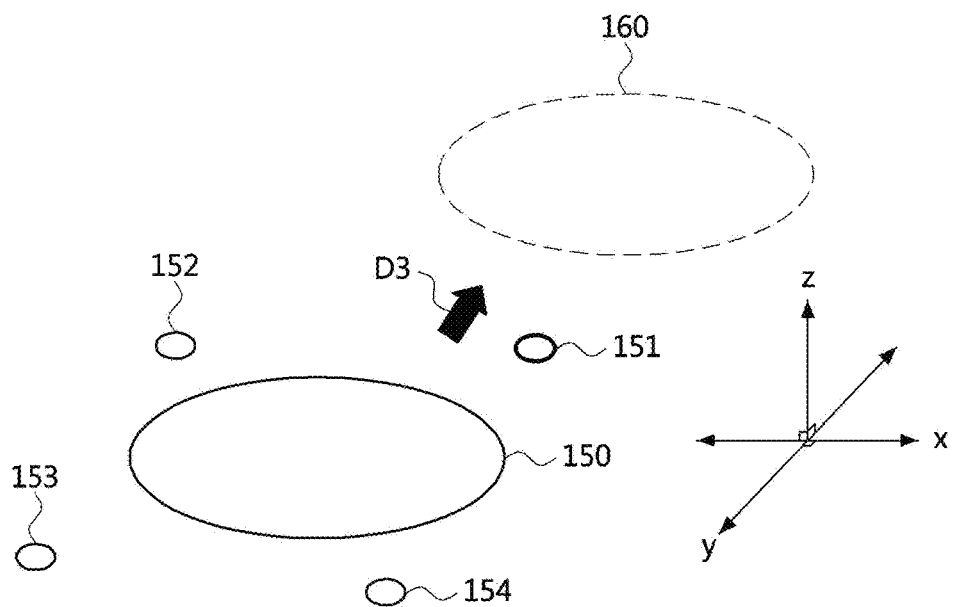
FIG. 19 is a conceptual diagram explaining the coil alignment method of FIG. 18.

FIG. 18 is a fifth flow chart explaining a coil alignment method according to embodiments of the present disclosure, and FIG. 19 is a conceptual diagram explaining the coil alignment method of FIG. 18.

The coil alignment method according to the present embodiment may be performed by a coil alignment apparatus coupled to a GA controller.

As shown in FIGS. 18 and 19, the coil alignment apparatus may sense strengths of magnetic fields induced at the GA coil 150 disposed in a wireless charging parking area and the plurality of sensing coils 151 to 154 which are respectively coupled to the GA coil 150 at positions relative to the GA coil 150 from an EV entering the wireless charging parking area (S181).

Then, the coil alignment apparatus may calculate or determine a relative direction between the VA coil and the GA coil based on the magnetic field intensities sensed at the plurality of sensing coils 151 to 154 (S182). That is, the coil alignment apparatus may compare the magnetic field intensities sensed by the sensing coils 151 to 154, thereby determining the sensing coil in which the maximum magnetic field intensity is detected. Also, depending on the implementation, the coil alignment apparatus may identify a plurality of sensing coils having the maximum magnetic field intensity, or two or three sensing coils having the highest priority, and identify a center of the group consisting of two or three sensing coils as a direction D3 in which the GA coil 150 is to be moved.

Then, the coil alignment apparatus may move the GA coil 150 in the determined direction D3 (S183).

Then, the coil alignment apparatus may sense magnetic field intensities at a new position varying with the movement of the GA coil 150, and identify the sensing coil having the maximum magnetic field intensity among the sensed magnetic field intensities. The above steps may be repeatedly performed until the maximum magnetic field intensity or the maximum difference among the magnetic field intensities sensed at the plurality of sensing coils becomes within an error range. Then, the coil alignment apparatus may terminate the alignment when the maximum magnetic field intensity or the maximum difference becomes within the error range (S184).

Meanwhile, in the above-described example, the look-up table is not used basically, but the LUT may be additionally used according to an implementation. In this case, the coil alignment apparatus may compare the first magnetic field pattern according to the magnetic field intensities sensed at the plurality of sensing coils and the magnetic field patterns stored in the LUT after the sensing step, and identify the direction D3 on the basis of the second magnetic field pattern which is the same as or closest to the first magnetic field pattern.

Figure 20:
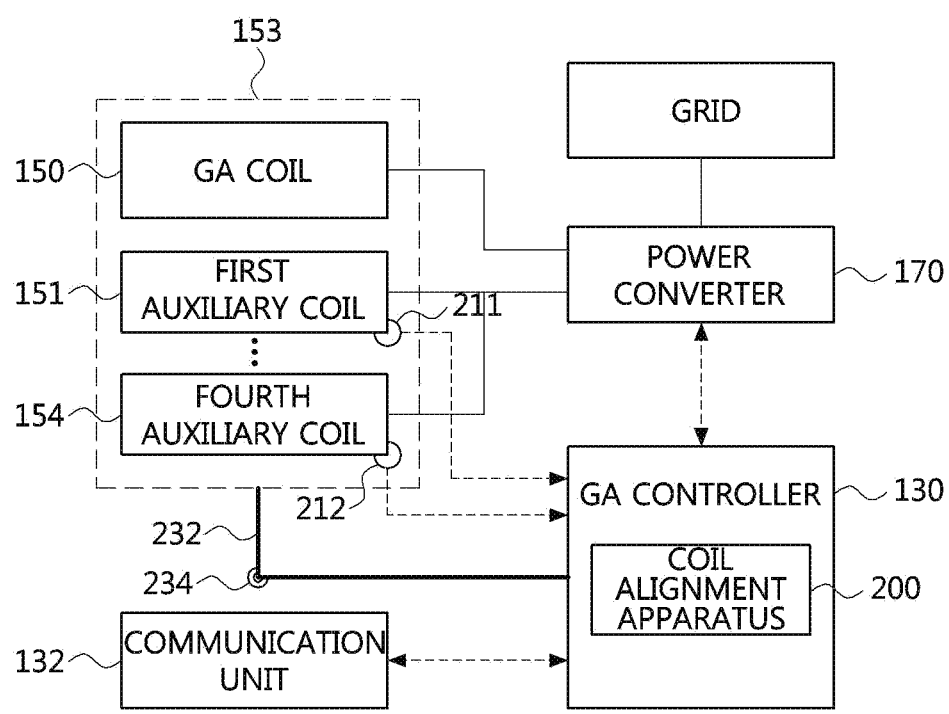
FIG. 20 is a block diagram illustrating a coil alignment apparatus performing the coil alignment method of FIG. 18.

FIG. 20 is a block diagram illustrating a coil alignment apparatus performing the coil alignment method of FIG. 18.

As shown in FIG. 20, the coil alignment apparatus according to embodiments of the present disclosure may perform a coil alignment method as coupled to a ground-side WPT apparatus disposed in a wireless charging parking area.

The ground-side WPT apparatus may be referred to as a GA, and comprise a GA controller 130, a GA coil 150, and a power converter 170. The GA controller 130 may transmit and receive signals and/or data with a VA controller through a communication unit 132. The GA coil 150 may be embedded in a primary pad 155, and first to fourth auxiliary coils 151 to 154 corresponding to a plurality of sensing coils may be disposed in the primary pad 155. Also, the power converter 170 may comprise an AC-DC converter (see 172 in FIG. 3) having a PFC function, a DC-AC inverter, a filter/IMN, etc., and be connected to a grid supplying commercial power.

The coil alignment apparatus 200 may comprise sensors 211 and 212, a comparator, an actuator, and the like, and may be implemented integrally with the GA controller 130. The integrated form may include a single housing or a combination of software and hardware that is difficult to separate or distinguish.

The sensors 211 and 212 may include a magnetic field measurement sensor, such as a hall sensor, coupled to each of the auxiliary coils. The signals sensed by the sensors 211 and 212 or the sensing results may be input to the GA controller 130 or the coil alignment apparatus 200.

While the embodiments of the present disclosure and their advantages have been described in detail, it should be understood that various changes, substitutions and alterations may be made herein without departing from the scope of the disclosure.

What is claimed is:

1. A coil alignment method performed in a coil alignment apparatus coupled to a vehicle assembly (VA) controller, the method comprising:
    sensing magnetic field intensities induced from a ground assembly (GA) coil through a first auxiliary coil and a second auxiliary coil which are fixedly coupled to a VA coil;
    comparing a first magnetic field intensity sensed through the first auxiliary coil with a second magnetic field intensity sensed through the second auxiliary coil;
    moving the VA coil or the GA coil to a position where a difference between the first magnetic field intensity and the second magnetic field intensity is less than or equal to a predetermined difference; and
    moving at least one of the VA coil and the GA coil in a direction facing each other, so that a center point of the VA coil and a center point of the GA coil are located within a shortest distance of each other or within a certain error range of the shortest distance, while maintaining the predetermined difference or less between the first magnetic field intensity and the second magnetic field intensity.

2. The coil alignment method according to claim 1, wherein the moving of the VA coil or the GA coil to the position comprises:
    when a distance from the center point of the VA coil to the first auxiliary coil is equal to a distance from the center point of the VA coil to the second auxiliary coil, equally aligning a first angle formed by a straight line connecting a center point of the first auxiliary coil and the center point of the GA coil and a straight line connecting the center point of the GA coil and the center point of the VA coil with a second angle formed by a straight line connecting a center point of the second auxiliary coil and the center point of the GA coil and a straight line connecting the center point of the GA coil and the center point of the VA coil.

3. The coil alignment method according to claim 1, wherein the center point of the VA coil, a center point of the first auxiliary coil, and a center point of the second auxiliary coil are arranged in one of a straight line, a triangle shape on a first plane, a triangular shape on a second plane and a triangular shape on a third plane, the first plane being parallel to a horizontal plane perpendicular to a magnetic center line of the GA coil, the second plane intersecting the horizontal plane, and the third plane being perpendicular to the horizontal plane.

4. The coil alignment method according to claim 1, wherein the predetermined difference is zero or a difference within a predetermined error range of zero.

5. The coil alignment method according to claim 1, wherein the moving of the at least one of the VA coil and the GA coil in the direction facing each other comprises:
transmitting a signal or message for controlling movement of the GA coil from the VA controller to a GA controller coupled to the GA coil when the GA coil is moved.

6. A coil alignment method performed in a coil alignment apparatus coupled to a vehicle assembly (VA) controller, the method comprising:
sensing magnetic field intensities induced from a ground assembly (GA) coil through a first auxiliary coil and a second auxiliary coil which are coupled to a VA coil at respective relative positions spaced apart from the VA coil by predetermined distances;
comparing a first magnetic field intensity sensed through the first auxiliary coil with a second magnetic field intensity sensed through the second auxiliary coil;
moving the VA coil or the GA coil to a position where a difference between the first magnetic field intensity and the second magnetic field intensity is less than or equal to a predetermined difference;
comparing a first magnetic field pattern at the position where there is a predetermined distance or less between the first magnetic field intensity and the second magnetic field intensity with magnetic field patterns stored in a look-up table; and
calculating a distance and a direction between the VA coil and the GA coil based on a second magnetic field pattern that is the same as or the closest to the first magnetic field pattern among the magnetic field patterns stored in the look-up table.

7. The coil alignment method according to claim 6, wherein the magnetic field patterns stored in the look-up table have a normal distribution probability density function shape with a highest value at a center point of the GA coil.

8. The coil alignment method according to claim 6, wherein the moving of the VA coil or the GA coil to the position comprises:
moving at least one of the GA coil and the VA coil in a direction facing each other based on the calculated distance and direction, so that a center point of the VA coil and a center point of the GA coil are located within a shortest distance of each other or within a predetermined error range from the shortest distance.

9. A coil alignment method performed in a coil alignment apparatus coupled to a ground assembly (GA) controller, the method comprising:
supplying electric power to a GA coil to form a magnetic field when a vehicle enters a wireless charging area;
receiving magnetic field intensities sensed at a first auxiliary coil and a second auxiliary coil which are fixedly coupled to a vehicle assembly (VA) coil from a VA controller mounted on the vehicle through the GA controller;
moving the GA coil to a position where a difference between the respective magnetic field intensities is less than or equal to a predetermined difference; and
moving the GA coil in a direction facing the VA coil while maintaining the predetermined difference or less between the magnetic field intensities.

10. The coil alignment method according to claim 9, further comprising, before the moving of the GA coil in the direction facing the VA coil:
comparing a first magnetic field pattern at the position where there is a predetermined difference or less between the magnetic field intensities with magnetic field patterns stored in a look-up table; and
determining a distance and a direction of the GA coil from the VA coil based on a second magnetic field pattern that is the same as or the closest to the first magnetic field pattern among the magnetic field patterns stored in the look-up table.

11. The coil alignment method according to claim 10, wherein the moving of the GA coil in the direction facing the VA coil is terminated when a center point of the VA coil and a center point of the GA coil are located within a shortest distance of each other or within a predetermined error range from the shortest distance.

12. A coil alignment method performed in a coil alignment apparatus coupled to a vehicle assembly (VA) controller, the method comprising:
supplying electric power to a VA coil mounted on a vehicle to form a magnetic field after the vehicle enters a wireless charging area;
receiving, from a ground assembly (GA) controller, alignment information indicating a movement direction and distance calculated based on magnetic field intensities sensed at a plurality of sensing coils coupled to a GA coil connected to the GA controller at respective positions relative to the GA coil; and
moving the VA coil according to the received alignment information.

13. The coil alignment method according to claim 12, wherein the receiving of the alignment information and the moving of the VA coil are repeated until a maximum difference among the magnetic field intensities sensed at the plurality of sensing coils becomes within a predetermined error range.

14. A coil alignment method performed in a coil alignment apparatus coupled to a ground assembly (GA) controller, the method comprising:
sensing magnetic fields induced in a plurality of sensing coils inductively coupled to a GA coil located in a wireless charging area at respective positions relative to the GA coil from a vehicle entering the wireless charging area;
moving, a first time, the GA coil in a direction toward a sensing coil having a maximum magnetic field intensity among the plurality of sensing coils; and
moving, a second time, the GA coil toward a sensing coil having a maximum magnetic field intensity among magnetic field intensities sensed through the plurality of sensing coils at a position to which the GA coil is moved the first time.

15. The coil alignment method according to claim 14, wherein the moving the second time is terminated when a maximum difference among the magnetic field intensities sensed through the plurality of sensing coils becomes within a predetermined error range.

16. The coil alignment method according to claim 14, further comprising, after the sensing of the magnetic fields:
   comparing a first magnetic field pattern according to magnetic field intensities sensed at the plurality of sensing coils with magnetic field patterns stored in a look-up table; and
   determining the direction toward the sensing coil based on a second magnetic field pattern that is the same as or the closest to the first magnetic field pattern among the magnetic field patterns stored in the look-up table.

* * * * *